United States Patent [19]

Tanner, III et al.

[11] Patent Number: 4,639,596
[45] Date of Patent: Jan. 27, 1987

[54] PETROLEUM RESERVOIR FLOODING METHOD

[75] Inventors: Harley L. Tanner, III, Houston; Joseph C. Allen, Bellaire, both of Tex.

[73] Assignee: Texaco Inc., White Plains, N.Y.

[21] Appl. No.: 456,065

[22] Filed: Jan. 6, 1983

[51] Int. Cl.$^4$ .............................................. G01T 1/18
[52] U.S. Cl. .................................................... 250/259
[58] Field of Search ................ 250/256, 259, 260, 269

[56] References Cited

U.S. PATENT DOCUMENTS 3,562,523  2/1971  Richardson et al. ................ 250/259
3,748,474  7/1973  Murphy .................................. 250/259
3,825,752  7/1974  Murphy et al. ....................... 250/259

Primary Examiner—Janice A. Howell
Attorney, Agent, or Firm—Robert A. Kulason; Ronald G. Gillespie

[57] ABSTRACT

A method of flooding a petroleum reservoir by way of an injection well to aid in the recovery of hydrocarbons from a recovery well includes running a radioactive well logging tool in the injection well to derive a first well log of the reservoir in the vicinity of the injection well. The reservoir is then flooded with a solvent injected into the reservoir at a predetermined rate from the injection well. The radioactive well logging tool is again operated to derive a second well log. High salinity salt water is injected into the reservoir from the injection well. The radioactive well logging tool is run again to derive a third well log. The well logs are utilized to provide a record of the effectiveness of the solvent flood.

7 Claims, 5 Drawing Figures

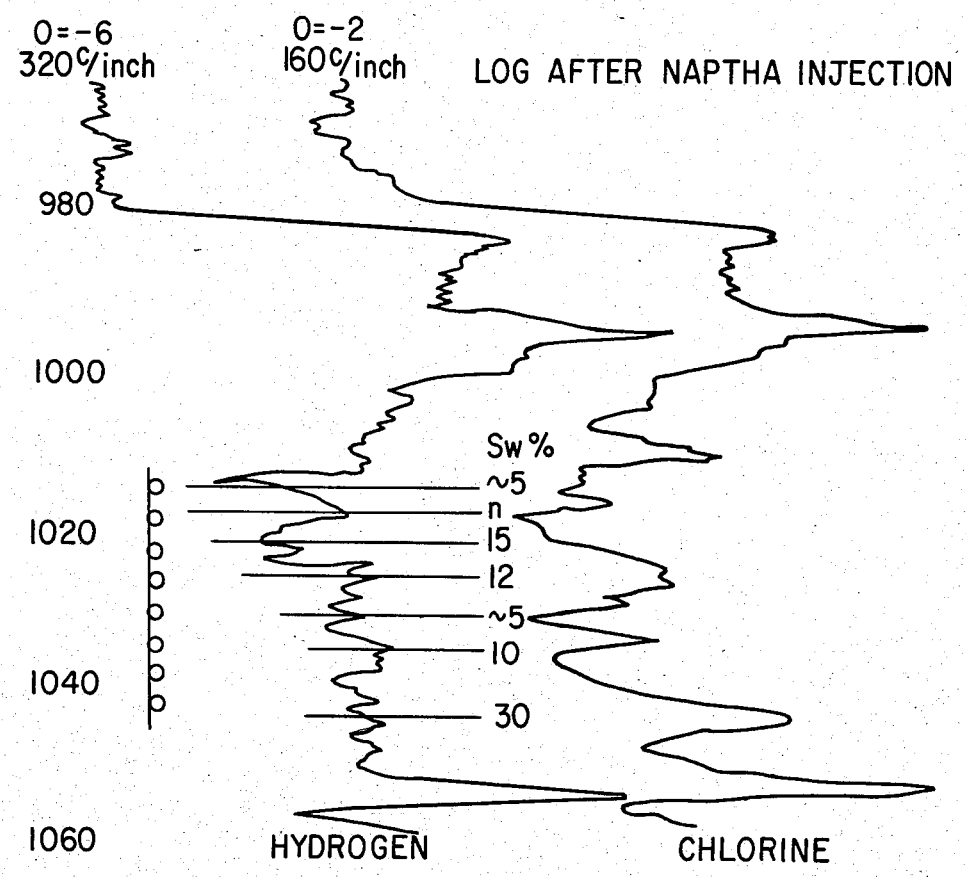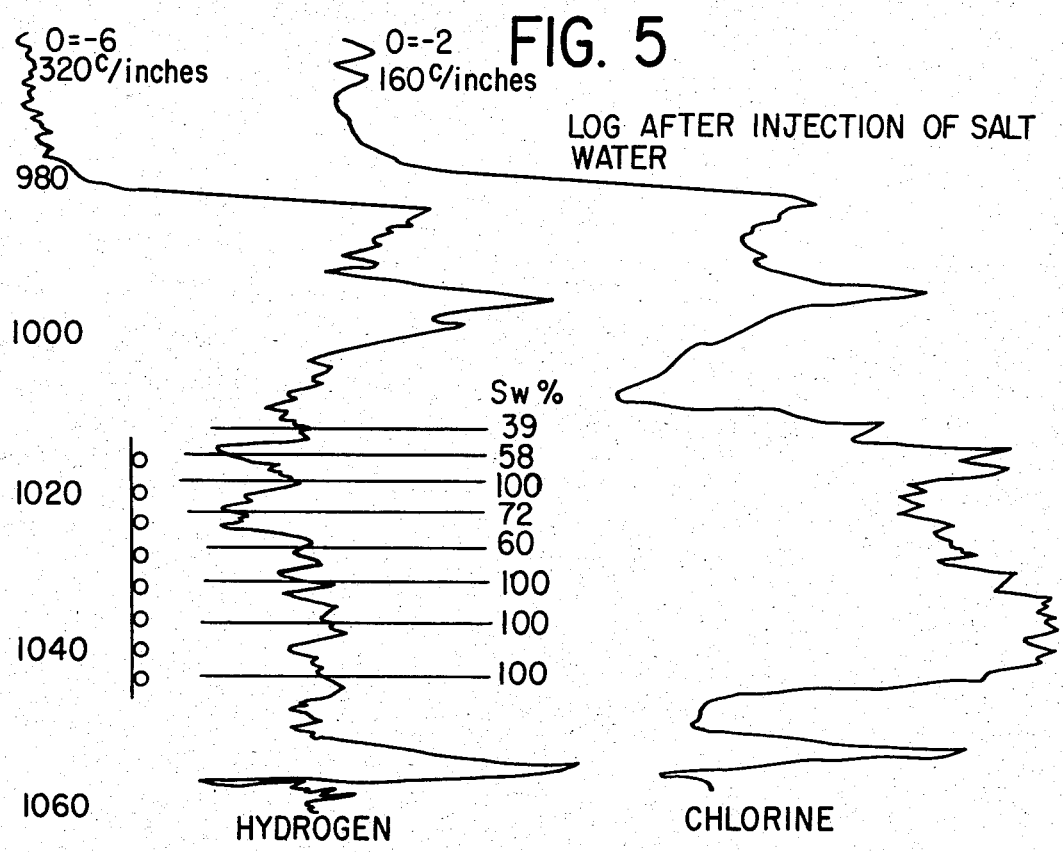

PETROLEUM RESERVOIR FLOODING METHOD

BACKGROUND OF THE INVENTION

Field of The Invention

The present invention relates to petroleum recovery methods in general and, more particularly, to petroleum recovery methods used in enhanced oil recovery techniques.

SUMMARY OF THE INVENTION

A method of flooding a petroleum reservoir by way of an injection well to aid in the recovery of hydrocarbons from a recovery well includes running a radioactive well logging tool in the injection well to derive a first well log of the reservoir in the vicinity of the injection well. The reservoir is then flooded with a solvent injected into the reservoir at a predetermined rate from the injection well. The radioactive well logging tool is again operated to derive a second well log. High salinity salt water is injected into the reservoir from the injection well. The radioactive well logging tool is run again to derive a third well log. The well logs are utilized to provide a record of the effectiveness of the solvent flood.

The objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

FIGS. 2, 3, 4 and 5 are graphical representations of well logs obtained during the practice of the present invention using the well logging system of FIG. 1.

DESCRIPTION OF THE INVENTION

Figure 1:
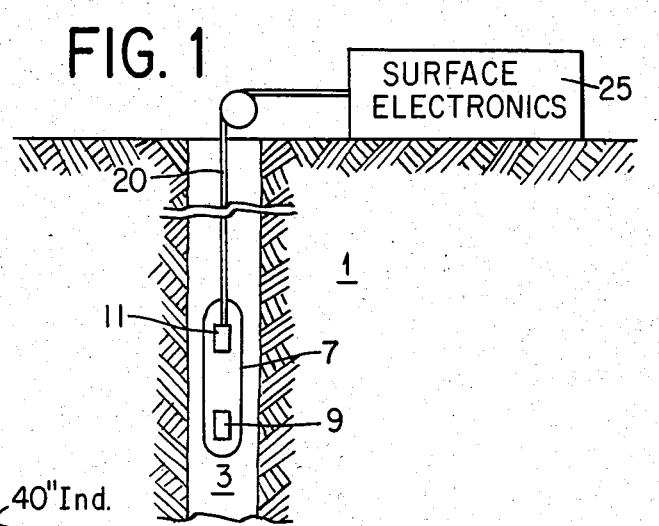
FIG. 1 is a simplified block diagram of a radioactive well logging system used in the practice of the method of the present invention.

The method of the present invention develops an injectivity profile of a petroleum reservoir while an enhanced oil recovery program is in progress. With reference to FIG. 1 there is shown an earth formation 1 having an injection well 3. Prior to the flooding operation a well logging tool 7 is run through injection well 3.

Tool 7 is of the type described and disclosed in U.S. Pat. No. 3,772,513; issued Nov. 13, 1973 and assigned to Texaco Inc., assignee of the present invention. Well logging tool 7 includes a neutron source 9, which is used to irradiate formation 1 with neutrons, and a conventional gamma ray detector assembly 11 which detects gamma radiation resulting from thermal neutron capture in hydrogen and chlorine. Neutron source 9 is preferably one with a relatively long life to give stability and which is relatively free of attendant gamma ray emission; and for example may comprise the combination of beryllium with either actinium 227 or plutonium or radium D or polonium or americium. When logging tool 7 containing neutron source 9 is moved through formation 1 at a given rate of speed capture gamma ray intensity can be recorded. Gamma ray detector assembly 11 provides electrical pulses, corresponding in frequency and peak amplitude to the detected gamma radiation, uphole by way of a well logging cable 20 to surface electronics 25. The pulses representative of the detected gamma radiation are processed and recorded by surface electronics 25 to provide well logs of the hydrogen and chlorine contents of the formation adjacent borehole 3. The utilization of the neutron source and the gamma ray detector assembly in well logging is well known in the art. However, their application as part of a flood program is not known.

Figure 2:
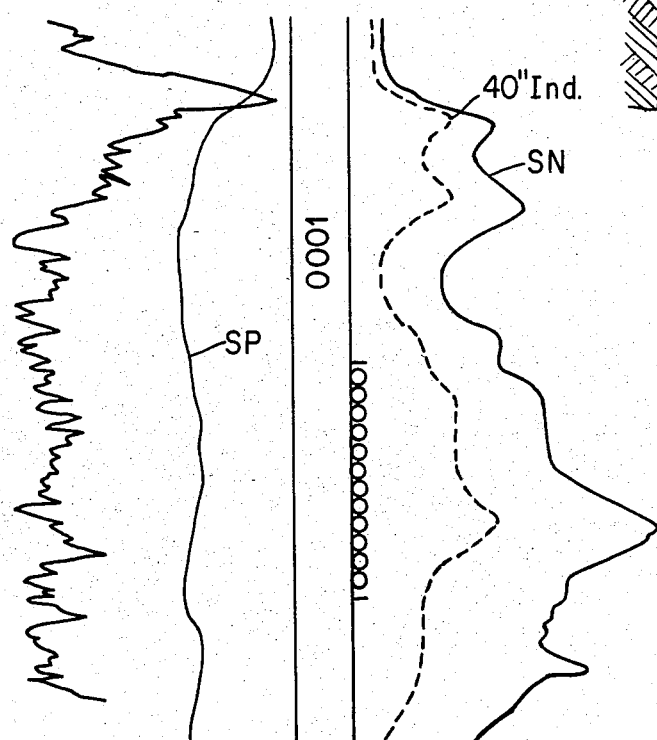

In one experiment the formation water had a salinity of 21,000 to 22,000 ppm NaCl that was determined from an open hole resistivity well log shown in FIG. 2 and from produced formation waters. The interval at which the log was run had an average porosity of 38% and average water saturation of 47% in the zones of interest. Since the salinity of the formation water was so low it was not possible to determine from well logging tool 7 if the formation was oil bearing.

Figure 3:
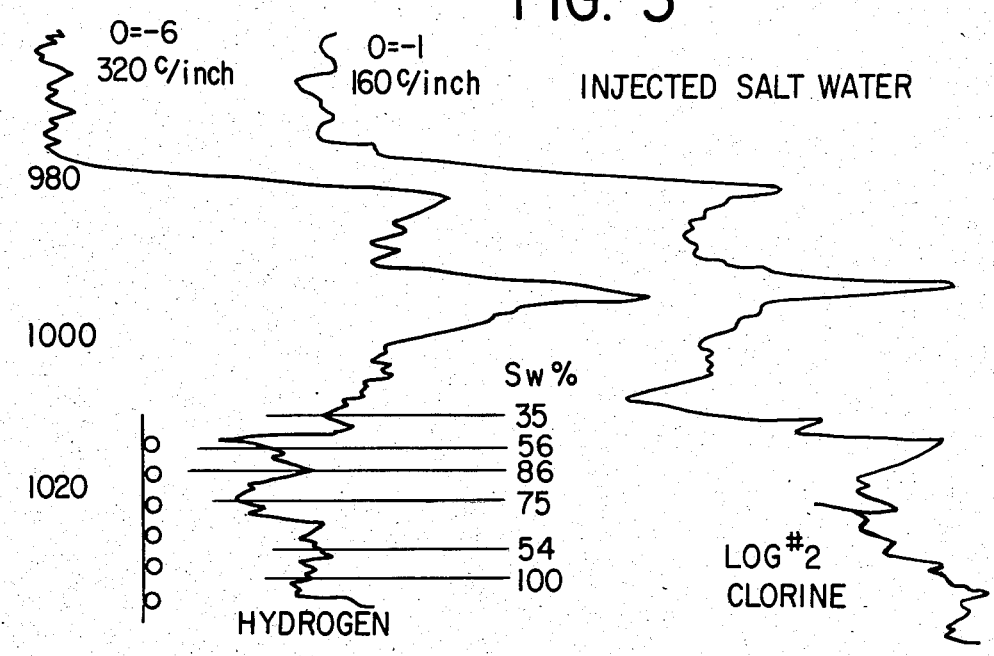

A predetermined quantity of a high salinity water (195,000 ppm NaCl) water was injected into well 3 at a predetermined rate and pressure. Well logging tool 7 was again operated and the water saturation was determined from the recording of that log which is shown in FIG. 3. In the experiment water saturation calculated for the formation interval of interest ranged from 35% to 100% and it was apparent from the water saturation values derived that some oil had been displaced from around the injection well 3 for an approximate 7 to 8 inches which is the depth of investigation for a chlorine well log.

The next step is to inject a solvent into the formation. One such solvent is naphtha. After waiting a predetermined time period, which in this example was one day, the well logging tool was again run and the resulting log is shown in FIG. 4. Water saturations were derived for the interval of interest and ranged from approximately 25% to 30% which indicated that the naphtha had essentially displaced most of the salt water previously injected.

A high salinity salt water again was injected into the formation at substantially the same rate as before and well logging tool 7 was again run in injection well 3. The well log, shown in FIG. 5, yielded water saturation of 39% to 100% in the predetermined interval. The high water saturation indicated that most of the original oil in place near the well bore had been removed by the three phases of fluid injection.

It should be noted that salt water was injected into the formation prior to the injection of the solvent because the water formation was of low salinity. Where the formation water is of higher salinity then the first injection of salt water and the well logging step immediately following that injection may be eliminated.

The method of the present invention, as hereinbefore described is a method of flooding a petroleum reservoir to aid in the recovery of crude oil. More specifically, the flooding method involves running well logs in the injection well to evaluate the utilization of a solvent flood.

What is claimed is:

1. A method of flooding a petroleum reservoir in an earth formation by way of an injection well to aid in the recovery of hydrocarbons from a recovery well comprising:

running a radioactive well logging tool in the injection well to derive a first well log of the reservoir in the vicinity of the injection well, flooding the reservoir with a solvent fluid injected in the reservoir at a predetermined rate from the injection well to displace the hydrocarbons present in the reservoir, running the well logging tool in the injection well so as to derive a second well log, injecting substantially high salinity salt water into the reservoir, running the well logging tool in the injection well so as to derive a third well log, and utilizing the well logs to provide a record of the effectiveness of the solvent flood.

2. A method as described in claim 1 in which each running of the well logging tool includes:

irradiating the earth formation in an interval of interest with neutrons, detecting the gamma radiation from the interval of interest, and providing the well log in accordance with the detected gamma radiation.

3. A method as described in claim 2 in which the solvent is naphtha.

4. A method as described in claim 3 further comprising the steps of:

injecting water having a predetermined salinity into the reservoir prior to the flooding step, and running the well logging tool in the injection well subsequent to the last mentioned salt water injection step but prior to the flooding step to derive a fourth well log; and the utilization step uses all four well logs.

5. A method as described in claim 4 in which each well log includes a hydrogen curve and a chlorine curve.

6. A method as described in claim 5 in which the neutron source has a relatively long life and is substantially free of attendant gamma ray emission.

7. A method as described in claim 6 in which the irradiation of the interval of interest of the formation produces gamma radiation resulting from thermal neutron capture in hydrogen and chlorine.

* * * * *